United States Patent [19]

Nakashima et al.

[11] Patent Number: 4,773,813
[45] Date of Patent: Sep. 27, 1988

[54] INDUSTRIAL ROBOT

[75] Inventors: Seiichiro Nakashima; Kenichi Toyoda, both of Hino; Shigemi Inagaki, Kokubunji; Susumu Ito, Hino, all of Japan

[73] Assignee: Fanuc Ltd., Yamanashi, Japan

[21] Appl. No.: 32,649

[22] PCT Filed: Jun. 24, 1986

[86] PCT No.: PCT/JP86/00321

§ 371 Date: Feb. 24, 1987

§ 102(e) Date: Feb. 24, 1987

[87] PCT Pub. No.: WO87/00111

PCT Pub. Date: Jan. 15, 1987

[30] Foreign Application Priority Data

Jun. 24, 1985 [JP] Japan .................. 60-135889

[51] Int. Cl.$^4$ ............... B66C 23/00; B66F 9/00
[52] U.S. Cl. ...................... 414/680; 74/625; 901/4; 901/23
[58] Field of Search ........... 318/568; 414/680, 735, 414/4; 310/112; 74/625; 901/4, 23, 24, 15

[56] References Cited

U.S. PATENT DOCUMENTS

| 3,217,604 | 11/1965 | Knox ..................... 74/625 X |
| 3,372,607 | 3/1968 | Lathrop, II et al. ............ 74/625 |
| 3,648,143 | 3/1972 | Harper et al. .............. 901/23 X |
| 4,393,965 | 7/1983 | Zouzoulas ................ 74/625 X |
| 4,586,868 | 5/1986 | Nakashima et al. ........... 414/735 |
| 4,626,165 | 12/1986 | Nakashima et al. ........... 414/735 |
| 4,637,773 | 1/1987 | Nakashima et al. ........... 414/732 |

FOREIGN PATENT DOCUMENTS

| 4617457 | 1/1967 | Japan . |
| 51-53586 | 3/1970 | Japan . |
| 47-22410 | 3/1971 | Japan . |
| 59-142087 | 1/1983 | Japan . |
| 59201790 | 4/1983 | Japan . |
| 60118484 | 11/1983 | Japan . |

OTHER PUBLICATIONS

Morisawa Kazuei "Dendoki Oyo".

Primary Examiner—Robert J. Spar
Assistant Examiner—Jennifer L. Doyle
Attorney, Agent, or Firm—Armstrong, Nikaido, Marmelstein & Kubovcik

[57] ABSTRACT

An industrial robot comprises a robot body having an operating portion (13), a driving motor (19) for driving the operating portion (13) and the a handle (29). A casing (21) of the driving motor (19) is secured to an outer wall of the robot body by bolts (25), and an output shaft (26) of the driving motor (19) is connected to the operating portion (13). An inner brake device of the driving motor (19) secures the output shaft (26) to the casing (21) when the driving motor (19) is stopped. If the driving motor (19) is stopped by a malfunction or the like, the bolts (25) are taken out and the handle (29) is attached to the casing (21) of the driving motor (19). By operating the handle (29), the output shaft (26) of the driving motor (19) is rotated together with the casing (21) and the operating portion (13) of the robot is moved.

6 Claims, 2 Drawing Sheets

INDUSTRIAL ROBOT

TECHNICAL FIELD

The present invention relates to an industrial robot. More particularly, the present invention relates to a manual operation mechanism of a robot, which is disposed to manually withdraw an operating portion such as a robot arm when an industrial robot is stopped by a malfunction or the like and control of the robot becomes impossible.

BACKGROUND ART

In an automation line having an industrial robot introduced therein, if the robot is stopped by a malfunction or the like and control becomes impossible, it is necessary to repair the robot urgently and start the operation again. However, where it is difficult to accomplish restoration in a short time, it is necessary to withdraw the stopped robot from the line and continue the operation of the line without using the robot.

Where stopping of the robot is due to an electrical fault in a control device, a driving circuit of a driving motor or the like, since a rotary operation portion such as an arm of the robot is not electrically moved, in order to withdraw the robot, it is necessary to move the rotary operating portion mechanically by hand. In general, however, since a brake device is built-into a motor for driving the rotary operating portion of the robot to brake an output shaft of the motor when the motor is stopped, it is very difficult to manually move the rotary operating porting of the stopped robot.

DISCLOSURE OF THE INVENTION

In accordance with the present invention, there is provided an industrial robot comprising a robot body having an operating portion, a driving motor for driving the operating portion and a handle member, wherein the driving motor comprises a casing secured to an outer wall of the robot body by bolts, an output shaft connected to the operating portion and an inner brake device for securing the output shaft to the casing when the driving motor is stopped, and the handle member is dismountably attachable to the casing of the driving motor so that after the bolts have been taken out, the casing of the driving motor can be manually rotated by the handle member.

In the industrial robot of the present invention, where the robot is stopped by a malfunction or the like, the bolts securing the casing of the driving motor are taken out, the handle is attached to the casing of the driving motor and the output shaft of the motor can be rotated by turning the casing of the motor by the handle. Accordingly, the operating portion connected to the output shaft of the motor can be withdraw very simply and promptly.

The above-mentioned and other features and advantages of the present invention will become apparent from the following description of preferred embodiments of the present invention made with reference to the accompanying drawings.

BEST MODE FOR CARRYING OUT THE INVENTION

Figure 1:
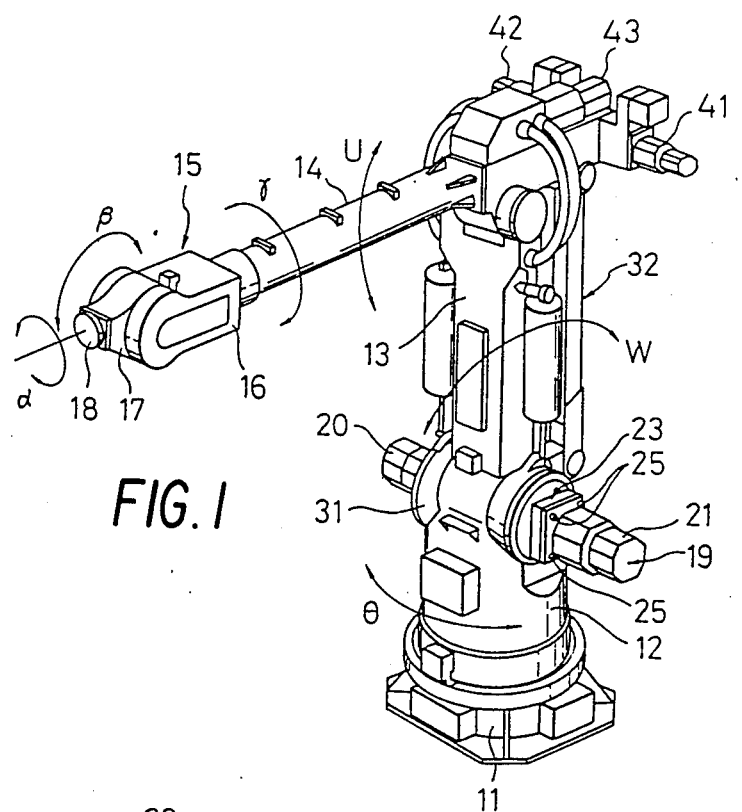
FIG. 1 is an entire perspective view illustrating an articulated industrial robot according to one preferred embodiment of the present invention.

FIG. 1 illustrates a preferred embodiment in which the present invention is applied to a six-axis articulated industrial robot. The robot body has a base 11 secured to a setting surface, and the base 11 is provided with a turning body 12 as an operating portion rotatable on the direction of arrow $\theta$ around the axis vertical to the setting surface. The turning body 12 is provided with an upper arm 13 as an operating portion rotatable in the direction of arrow W around the axis orthogonal to the rotation axis of the turning body 12. A forearm 14 is disposed on the top end of the upper arm 13 as an operating portion rotatable in the direction of arrow U around the axis parallel to the rotation axis of the upper arm 13, and a wrist unit 15 is mounted on the top end of the forearm 14. The wrist unit 15 comprises a wrist base 16 rotatable in the direction of arrow $\gamma$ around the longitudinal axis of the forearm, a wrist intermediate portion 17 supported in the wrist base 16 rotatably in the direction orthogonal to the rotation axis of the wrist base 16 and a wrist tip end portion 18 supported on the wrist intermediate portion 17 rotatably in the direction orthogonal to the rotation axis of the wrist intermediate portion 17.

A motor for rotating and driving the turning body 12 is disposed on the base 11, although not shown in the drawings. An upper arm driving motor 19 for driving the upper arm 13 and a driving motor 20 for rotating and driving the forearm 14 are disposed on the turning body 12. A driving motor 41 for rotating and driving the wrist base 16, a driving motor 42 for rotating and driving the wrist intermediate portion 17, and a driving motor 43 for rotating and driving the wrist tip end portion 18 are disposed on the forearm 14.

Figure 2:
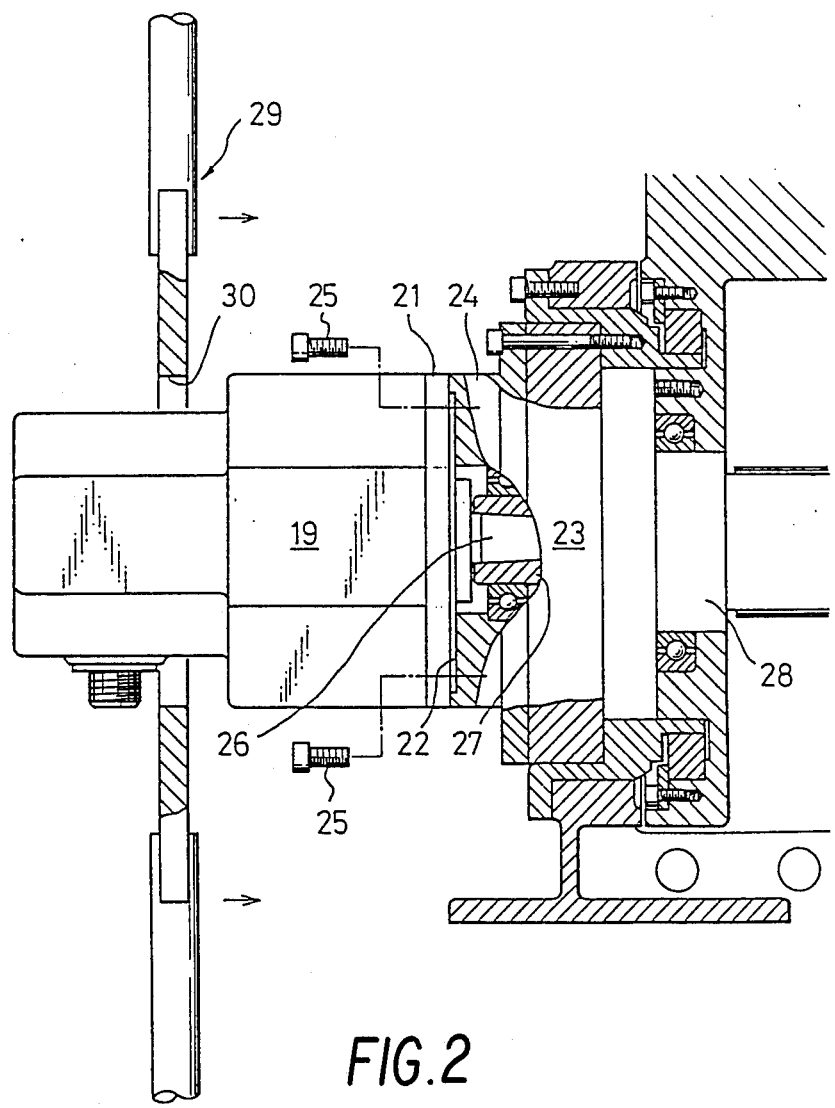
FIG. 2 is a partial sectional side view illustrating a portion surrounding an upper arm driving motor of the robot shown in FIG. 1.

The attachment structure for the upper arm driving motor 19 will now be described in detail with reference to FIG. 2. A casing 21 of the motor 19 is rotatably fitted with a fixing portion 24 of a reduction gear 23 secured to the outer wall of the turning body 12 through a socket portion 22 formed on the end of the casing 21, and the casing 21 of the motor 19 is fixed to the fixing portion 24 of the reduction gear 23 through a plurality of fixing bolts 25. An output shaft 26 of the motor 19 is connected and secured to an input shaft 27 of the reduction gear 23. An output shaft 28 of the reduction gear 23 is connected to the upper arm 13 through a power transmission mechanism not shown in the drawings. The motor 19 is provided with a brake device (not shown) in the interior thereof, and when the motor 19 is stopped, this brake device secures the output shaft 26 of the motor 19 to the casing 21 of the motor 19 and when the motor 19 is operated, the brake device is excited to unlock the output shaft 26. A motor provided with such a brake device is well-known.

Figure 3:
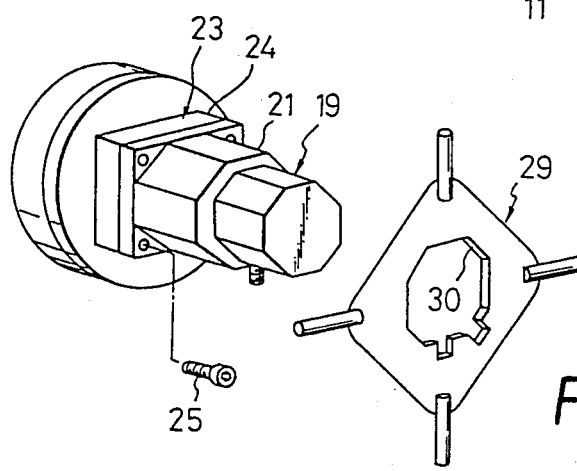
FIG. 3 is a perspective view illustrating the upper arm driving motor and handle of the robot shown in FIG. 1.

As shown in FIG. 3, according to the present invention, a handle 29 which is dismountably attachable to the casing 21 of the motor is prepared. In the present embodiment, the casing 21 of the motor 19 has a substantially octagonal outer contour, and the handle 29 has an opening or fitting hole 30 to be fitted with the outer contour of the casing 21 of the motor 19.

In the present embodiment, the forearm driving motor 20 has an attachment structure similar to that of the upper arm driving motor 19. More specifically, the casing of the forearm driving motor 20 is rotatably fitted to a fixing portion of a reduction gear 31 fixed to the turning body 12 and is secured to the fixing portion of the reduction gear 31 through bolts (not shown). The output shaft of the forearm driving motor 20 is connected and fixed to the input shaft of the reduction gear 31 and the output shaft of the reduction gear 31 is connected to the forearm 14 through a power transmission mechanism having a parallel link mechanism 32, although this feature is not specifically shown in the drawings. The forearm driving motor 20, like the upper arm driving motor 19, has a brake device in the interior thereof. Preferably, the outer contour of the casing of the forearm driving motor 20 has the same contour as the outer contour of the casing 21 of the upper arm driving motor 19. In this case, the handle 20 can be also used for rotating the casing of the forearm driving motor 20.

Where the robot is stopped by a malfunction or the like and electric control of the robot becomes impossible, the bolts 25 fixing the casing 21 of the motor 19 are taken out, and the handle 29 fitted to the casing 21 of the motor 19 is turned. By this turning operation, the output shaft 26 of the upper arm driving motor 19 is rotated together with the casing 21 of the motor 19 and the rotation of the output shaft 26 of the motor 19 is transmitted to the upper arm 13 through the reduction gear 23. By the rotation operation of the upper arm 13, the robot can be moved to a necessary withdrawn position. If the motor 19 is manually turned, the input shaft of the reduction gear 23 is rotated and, therefore, the upper arm 13 can be operated by a relatively small power. If necessary, by manually turning the forearm driving motor 20 in the same manner as described above, the robot can be moved to a necessary withdrawn position.

The present invention has been described with reference to the embodiment illustrated in the accompanying drawings, but the present invention is not limited by this embodiment and various changes can be made to structural elements within the scope set forth in the claims. For example, the handle may be a bar that can be screwed to the casing of the motor. The present invention can be applied to not only an articulated robot but also, for example, a polar coordinate robot. In the foregoing embodiment, the motor is directly connected to the reduction gear and the casing of the motor is secured to the outer wall of the robot through the fixing portion of the reduction gear by means of bolts, but there may be adopted a modification in which the reduction gear is connected to the motor through a power transmission mechanism. In this case, the motor is directly secured to the outer wall of the robot by means of bolts.

CAPABILITY OF EXPLOITATION IN INDUSTRY

As is apparent from the foregoing description, according to the present invention, where the robot is stopped by a malfunction or the like, by taking out the bolt fixing the casing of the motor, attaching the handle to the casing of the motor and turning the casing of the motor by the handle, the output shaft of the motor can be turned. Accordingly, the operating portion of the robot connected to the output shaft of the motor can be moved to a necessary withdrawn position simply and promptly. Furthermore, since this is accomplished by the manual operation, a special driving mechanism need not be disposed in parallel to the driving mechanism of the motor. Therefore, an industrial robot having a simple structure can be provided. It is readily understood that the present invention can be applied to various kinds of industrial robots having differing modes of motion.

We claim:

1. An industrial robot comprising:
   a robot body including at least first and second operating portions rotatably connected to each other;
   a driving motor for driving said second operating portion, said driving motor including a casing secured to an outer wall of said first operating portion by bolts, said casing having engaging portions thereon, an output shaft rotatably supported to said casing and drivingly connected to said second operating portion, and an inner brake device for securing said output shaft to said casing when said driving motor is stopped by cutting off electrical power supplied thereto; and
   a handle member having engaging portions adapted to be drivingly engaged with said casing of said driving motor so that the handle engaging portions will drivingly engage with the casing engaging portions so that, after said bolts have been taken out, said handle member can be drivingly engaged with said casing of said driving motor and said casing of said driving motor can be manually rotated by said handle member to rotate said output shaft and move said second operating portion.

2. An industrial robot as set forth in claim 1, wherein said output shaft of said driving motor is connected to said second operating portion through a reduction gear mounted on said first operating portion.

3. An industrial robot as set forth in claim 1, wherein said engaging portions of said casing of said driving motor include a polygonal outer contour and said engaging portions of said handle member include an opening formed to engage said polygonal outer contour of said casing.

4. An industrial robot comprising:
   a robot body including at least a first operating portion, a second operating portion rotatably connected to said first operating portion, and a third operating portion rotatably connected to said second operating portion;
   first and second driving motors for driving said second and third operating portions, respectively, each of said first and second driving motors including a casing secured to an outer wall of said first operating portion by bolts, an output shaft rotatably supported to each said casing, each said casing having engaging portions thereon, and an inner brake device for securing each said output shaft to its respective casing when said driving motor is stopped by cutting off electrical power supplied thereto, said output shafts of said first and second driving motors being drivingly connected to said second and third operating portions, respectively; and
   a handle member having engaging portions adapted to be drivingly engaged with said casings of said first and second driving motors so that the handle engaging portions will drivingly engage with the casing engaging portions so that after said bolts have been taken out, said handle member can be drivingly engaged with one of said casings of said first and second driving motors and said one casing can be manually rotated by said handle member to rotate the output shaft supported to said casing and move said operating portion drivingly connected to said output shaft.

5. An industrial robot as set forth in claim 4, wherein each of the engaging portions of said casings of said driving motors includes a polygonal outer contour and said engaging portions of said handle member include an opening formed to engage said polygonal outer contours of said casings of said first and second driving motors.

6. An industrial robot as set forth in claim 4, wherein said first operating portion is rotatably mounted on a stationary base for rotation about a first axis, said second operating portion is rotatably connected to said first operating portion for rotation about a second axis perpendicular to said first axis, and said third operating portion is rotatably connected to said second operating portion for rotation about a third axis parallel to said second axis.

* * * * *